United States Patent
Heinzl

(10) Patent No.: US 9,656,883 B2
(45) Date of Patent: May 23, 2017

(54) FORWARD OSMOSIS SYSTEM COMPRISING SOLVENT SEPARATION BY MEANS OF MEMBRANE DISTILLATION

(75) Inventor: Wolfgang Heinzl, Ramerberg (DE)

(73) Assignee: AAA WATER TECHNOLOGIES AG, Cham (CH)

( * ) Notice: Subject to any disclaimer, the term of this patent is extended or adjusted under 35 U.S.C. 154(b) by 876 days.

(21) Appl. No.: 13/884,564

(22) PCT Filed: Oct. 6, 2011

(86) PCT No.: PCT/EP2011/004988
§ 371 (c)(1),
(2), (4) Date: Jun. 27, 2013

(87) PCT Pub. No.: WO2012/062392
PCT Pub. Date: May 18, 2012

(65) Prior Publication Data
US 2013/0264260 A1    Oct. 10, 2013

(30) Foreign Application Priority Data

Nov. 10, 2010   (DE) .................... 10 2010 050 892

(51) Int. Cl.
| | | |
|---|---|---|
| *C02F 1/44* | (2006.01) | |
| *B01D 61/58* | (2006.01) | |
| *B01D 61/36* | (2006.01) | |
| *B01D 61/00* | (2006.01) | |
| *C02F 103/08* | (2006.01) | |
| *C02F 1/14* | (2006.01) | |

(52) U.S. Cl.
CPC .............. *C02F 1/445* (2013.01); *B01D 61/00* (2013.01); *B01D 61/005* (2013.01);
(Continued)

(58) Field of Classification Search
CPC .... B01D 5/0027; B01D 5/003; B01D 5/0057; B01D 5/0069; B01D 5/0072;
(Continued)

(56) References Cited

U.S. PATENT DOCUMENTS 3,130,156 A *  4/1964  Neff .................... B01D 61/002
                                                         210/177
3,340,186 A   9/1967  Weyl
(Continued)

FOREIGN PATENT DOCUMENTS

EP   0 088 315 A1   9/1983
EP   0 094 543 B1   10/1986
(Continued)

OTHER PUBLICATIONS

K. Schneider et al., "Membrandestillation", Chemie Ingenieur Technik Wiley VCH. Verlag, vol. 56, No. 7, 1984, pp. 514-521.
English Abstract for WO 2007/054311 A1, May 18, 2007.
English Abstract for JP 63-162002 A.
English Abstract for EP 0 094 543 B1.
Mccutcheon J R, et al. : "A Novel Ammonia-Carbon Dioxide Forward (Direct) Osmosis Desalination Process," *Desalination*, Elsevier, Amsterdam, NL, Bd.174, Nr. 1, Apr. 1, 2005 (Apr. 1, 2005).
(Continued)

*Primary Examiner* — Katherine Zalasky
*Assistant Examiner* — Pranav Patel
(74) *Attorney, Agent, or Firm* — Hershkovitz & Associates, PLLC; Abraham Hershkovitz; Eugene C. Rzucidlo

(57) ABSTRACT

The invention relates to a system for separating a product contained as solvent in a solution to be processed, comprising at least one forward osmosis device (816) through which the solution to be processed and a draw solution flow, and a device connected downstream thereof for obtaining the
(Continued)

product (56, 62) from the diluted draw solution exiting the forward osmosis device, wherein the forward osmosis device comprises at least one flow channel conducting the solution to be processed and at least one flow channel conducting the draw solution, the inner space of a respective flow channel conducting the solution to be processed is delimited at least partially by a semi-permeable membrane wall that is permeable to the solvent of the solution to be processed but not to the substance dissolved therein, and at least one flow channel conducting the draw solution is delimited on opposite sides by membrane walls that are associated with two adjoining flow channels conducting the solution to be processed, such that solvent from the solution to be processed passes through the membrane walls into the adjoining flow channels conducting the draw solution.

17 Claims, 8 Drawing Sheets

(52) U.S. Cl.
CPC ............ *B01D 61/002* (2013.01); *B01D 61/36* (2013.01); *B01D 61/58* (2013.01); *C02F 1/14* (2013.01); *C02F 2103/08* (2013.01); *C02F 2303/16* (2013.01)

(58) Field of Classification Search
CPC B01D 19/0031; B01D 61/002; B01D 61/005; B01D 61/36; B01D 61/362; B01D 61/364; B01D 61/366; B01D 61/368; B01D 63/02; B01D 63/021; B01D 63/06; B01D 63/061; B01D 69/04; B01D 69/08; C02F 1/20; C02F 1/445; C02F 1/447; C02F 1/448

See application file for complete search history.

(56) References Cited

U.S. PATENT DOCUMENTS

| | | | |
|---|---|---|---|
| 6,716,355 B1 | 4/2004 | Hanemaaijer et al. | |
| 8,029,675 B2 | 10/2011 | Heinzl | |
| 2004/0099140 A1* | 5/2004 | Hesse | B01D 53/268 96/8 |
| 2004/0251010 A1* | 12/2004 | Doh | B01D 63/02 165/172 |
| 2006/0144789 A1 | 7/2006 | Cath et al. | |
| 2009/0000939 A1* | 1/2009 | Heinzl | B01D 63/10 203/80 |

FOREIGN PATENT DOCUMENTS

| | | |
|---|---|---|
| JP | 58-216704 A | 12/1983 |
| JP | 63-162002 A | 7/1988 |
| WO | WO 00/72947 A1 | 12/2000 |
| WO | WO 2005/089914 A1 | 9/2005 |
| WO | WO 2006/047577 A1 | 5/2006 |
| WO | WO 2007/054311 A1 | 5/2007 |
| WO | WO 2007/146094 A2 | 12/2007 |
| WO | WO 2007/147013 A1 | 12/2007 |
| WO | WO2009151709 * | 12/2009 |

OTHER PUBLICATIONS

International Preliminary Report on Patentability for PCT/EP2011/004988 mailed on May 10, 2013.

* cited by examiner

FORWARD OSMOSIS SYSTEM COMPRISING SOLVENT SEPARATION BY MEANS OF MEMBRANE DISTILLATION

CROSS-REFERENCE TO RELATED APPLICATIONS

This is a US National Stage of PCT/EP2011/004988 filed Oct. 6, 2011, which claims priority of German Patent Application No. DE 10 2010 050 892.6 filed Nov. 10, 2010, the entire contents of which are incorporated herein by reference.

FIELD OF THE INVENTION

The invention relates to a system for separating a product contained as a solvent in a solution to be processed. Such a system can, for example, be used for seawater desalination or for recovering drinking water from seawater, with in this case the seawater being the solution to be processed.

BACKGROUND OF THE INVENTION

Systems for separating a product contained as a solvent in a solution to be processed are known from the documents WPO 2007/147013 A1, J. R. McCutcheon, R. L. McGinnis, M. Elimelech: "A novel ammonia-carbon dioxide forward (direct) osmosis desalination process" (published in Desalination, Vol. 174, No. 1, 2005, pages 1 to 11), US 2006/0144789 A1 and WO 2007/146094 A2.

SUMMARY OF THE INVENTION

It is the aim of the invention to provide an improved system of the initially named kind which ensures a reliable, efficient separation with a compact design which is as simple as possible.

This object is satisfied in accordance with the invention by a system for separating a product contained as a solvent in a solution to be processed having at least one forward osmosis device flowed through by the solution to be processed and by a draw solution and having a device connected downstream thereof for recovering the product from diluted draw solution exiting the forward osmosis device, wherein the forward osmosis device comprises at least one flow passage conducting the solution to be processed and at least one flow passage conducting the draw solution, wherein the inner space of a respective flow passage conducting the solution to be processed is at least partly bounded by a semipermeable membrane wall which is permeable for the solvent of the solution to be processed, but not for the substance dissolved therein, and wherein at least one flow passage conducting the draw solution is bounded on mutually oppositely disposed sides by membrane walls which are associated with two adjacent flow passages conducting the solution to be processed such that solvent from the solution to be processed arrives in the adjacent flow passages conducting the draw solution through the membrane walls.

Due to this configuration, the system can be kept relatively simple and compact with a relatively large separation power. A larger number of flow passages conducting the solution to be processed and of flow passages conducting the draw solution can in particular also be provided without problem, whereby the efficiency of the system is correspondingly increased.

In contrast to reverse osmosis, it is not the hydraulic pressure which serves as the driving force for the transport of the solvent of the solution to be processed through the membrane, but rather the osmotic pressure gradient. The solute contained in the draw solution has a higher so-called osmotic potential than the solute contained in the solution to be processed. From a specific concentration of the draw solution onward, the osmotic potential on the permeate side is always higher than the osmotic potential on the side of the solution to be processed, i.e. the retentate.

Since the pressure gradient built up via the draw solution is larger than the hydraulic pressure gradient, a higher yield is achieved.

In the case of a use of the system for seawater desalination, in particular a semipermeable membrane can be used which is permeable for water, but not for the salt.

Saline solutions in particular with NaCL, $CaCl_2$, KCl, organic compounds such as sugar or also, for example, ammonium hydrogen carbonate dissolved in water, etc. can be used, for example as draw solution providing the driving force for the forward osmosis.

Reverse osmosis membranes can, for example, also be used as forward osmosis membranes.

In addition to saline solutions, solutions with organic compounds such as sugar can inter alia also be used as the draw solution. In long-chain organic compounds without vapor pressure, it is desirable if they are so large that the product, water in seawater desalination, for example, can be separated via a microfiltration or ultrafiltration membrane. The water represents the permeate here.

The use of solutions as the draw solution is in particular also conceivable when said solutions can be separated and regenerated via the vapor pressure such as ammonium hydrogen carbonate in water. Ammonium hydrogen carbonate can thus be dissolved in water, for example, whereby a draw solution is obtained. If this solution is heated, gaseous $NH_3$ and $CO_2$ is released. Pure water remains.

The draw solution preferably flows through the forward osmosis device in counter-flow to the solution to be processed. Generally, however, such configurations are also conceivable in which the draw solution flows through the forward osmosis device in parallel flow to the solution to be processed.

The forward osmosis device advantageously comprises a plurality of flow passages in parallel with one another and conducting the solution to be processed as well as a plurality of flow passages in parallel with one another and conducting the draw solution.

In this respect, the flow passages conducting the draw solution are preferably each bounded on mutually oppositely disposed sides by membrane walls which are associated with two adjacent flow passages conducting the solution to be processed.

A preferred practical embodiment of the system in accordance with the invention is characterized in that the product recovery device has a heating stage which is flowed through by the diluted draw solution exiting the forward osmosis device and which comprises at least one heating unit and at least one evaporator unit, wherein a respective heating unit comprises a heating fluid space at least partly bounded by a fluid-tight, heat-conducting wall and a respective evaporator unit comprises a vapor space at least partly bounded by a vapor-permeable, liquid-tight membrane wall, and wherein at least one flow passage, which is formed between a heating unit and an evaporator unit adjacent thereto and which conducts the draw solution, is provided in the heating stage such that the draw solution is heated via the fluid-tight, heat-conducting wall and the vapor arising from the draw solution arrives in the vapor space through the membrane wall.

It is of advantage in this respect if the product recovery device has at least one condensation/evaporation stage which is flowed through by the draw solution exiting the heating stage, which is supplied with vapor arising in the heating stage and which comprises at least one condensation unit and at least one evaporator unit, wherein a respective condensation unit comprises a first vapor space at least partly bounded by a condensation wall and a respective evaporator unit comprises a second vapor space at least partly bounded by a vapor-permeable, liquid-tight membrane wall, and wherein at least one flow passage, which is formed between such a condensation unit and such an evaporator unit adjacent thereto and which conducts the draw solution, is provided in a respective condensation/evaporation stage such that the draw solution is heated via the condensation wall and the vapor arising from the draw solution arrives in the second vapor space through the membrane wall, with preferably the draw solution exiting the last condensation/evaporation stage again being supplied to the forward osmosis device.

It is in particular also of advantage if the product recovery device comprises a condensation stage having at least one cooling unit and at least one condensation unit, wherein a respective cooling unit comprises a cooling fluid space preferably at least partly bounded by a fluid-tight, heat-conducting wall and a respective condensation unit comprises a vapor space at least partly bounded by a condensation wall, and wherein at least one cooling unit is directly adjacent to at least one condensation unit in the condensation stage such that the condensation wall of the respective condensation unit is cooled via the cooling unit, and wherein vapor preferably arising in a preceding condensation/evaporation stage is supplied to the condensation stage and the product can preferably be led off from the condensation stage in the form of the distillate arising in the condensation stage.

The heating stage can be heated by solar power, for example. A respective heating unit of the heating stage can therefore be flowed through by a heating fluid which is, for example, heated by solar power. The condensation stage can, for example, be cooled with cooling water. As already mentioned, the product can e.g. be recovered in the form of the distillate arising in the condensation stage.

If the product recovery device comprises, as previously mentioned, a heating stage, at least one condensation/evaporation stage and preferably a condensation stage, this concentration device is preferably in a vacuum; the cooling fluid and the heating fluid are preferably at environmental pressure and the draw solution is preferably in a vacuum. In the condensation/evaporation stage(s) and in the heating stage, the draw solution can in particular be at the boiling temperature corresponding to the absolute pressure in the vapor space of a respective adjacent evaporator unit over all stages, as is described in WO 2007/054311 which is herewith included in the disclosure content of the present application.

The draw solution to be processed and the draw solution can generally flow in counter-flow or also in parallel flow.

The forward osmosis device can be immersed into the solution to be processed, e.g. seawater, or it can be flowed through externally by the solution to be processed. If the forward osmosis solution is immersed into the solution to be processed, provision must expediently be made that the solution to be processed flows along the membrane wall to avoid a concentration polarization.

The solution diluted by the product, e.g. water, can therefore be supplied, for example, to a process for concentration such as is described in WO 2007/054311. This process for concentration can, however, generally also be replaced, in particular for seawater desalination, for example, with other processes such as in particular reverse osmosis, an MSF (multistage flash evaporation) process, an MED (multi-effect distillation) process, an MVC (mechanical vapor compression=desalination based on the MVC process) process.

In accordance with the invention, the product recovery device has a heated desorber stage which is flowed through by the diluted draw solution exiting the forward osmosis device and which comprises at least one gas space as well as at least one flow passage conducting the diluted draw solution, wherein a respective gas space is at least partly bounded by a vapor-permeable, liquid-tight membrane wall and wherein at least one flow passage is provided which is formed between such a gas space and a heating unit adjacent thereto and which conducts the draw solution such that the gas mixture expelled from the draw solution arrives in the gas space through the membrane wall and the product can preferably be led off in the form of draw solution exiting the heated desorber stage and purified of the gas mixture. The sodium hydrogen carbonate can advantageously be used as the draw solution, for example.

A respective heating unit in this respect expediently comprises a heating fluid space at least partly bounded by a fluid-tight heat-conducting wall.

In accordance with the invention, the gas mixture arising in the heated desorber stage is supplied to a combined absorber/solution cooler stage for generating regenerated draw solution, with the regenerated draw solution obtained through this absorber/solution cooler stage preferably again being supplied to the forward osmosis device.

It is of advantage in this respect if some of the purified draw solution exiting the heated desorber stage or some of the diluted draw solution exiting the forward osmosis device is moreover supplied to the combined absorber/solution cooler stage, wherein in the latter case preferably only such a partial amount of the diluted draw solution exiting the forward osmosis device is supplied to the heated desorber stage by which the mass of the concentrated draw solution increased on flowing through the forward osmosis device, while the remaining partial amount of diluted draw solution is supplied to the combined absorber/solution cooler stage.

In accordance with the invention, the absorber/solution cooler stage comprises at least one gas space which is preferably acted on by vacuum and contains gas mixture from the heated desorber stage as well as at least one flow passage conducting the purified or diluted draw solution, wherein a respective gas space is at least partly bounded by a vapor-permeable, liquid-tight membrane wall and wherein at least one flow passage is provided which is formed between such a gas space and a cooling unit adjacent thereto and which conducts the draw solution such that the gas mixture flows from the gas space through the membrane wall into the flow passage conducting the purified or diluted draw solution and is dissolved in the purified or diluted draw solution cooled by the cooling unit.

A device for drying and cooling gas, in particular air, by means of a hygroscopic solution is advantageously provided for supplying the absorber/solution cooler stage or its cooling units with cooling fluid.

In this respect, it is in particular advantageous if the gas drying/cooling device has a gas cooler/absorber stage which comprises at least one gas flow passage as well as a flow passage conducting the hygroscopic solution, wherein the inner space or gas space of a respective gas flow passage is bounded at least partly by a vapor-permeable, liquid tight membrane wall and at least one flow passage is provided which conducts hygroscopic solution between such a gas flow passage and a further such gas flow passage adjacent thereto or an adjacent cooling unit such that moisture, in particular water vapor, is transferred from the gas via the membrane wall into the hygroscopic solution and is absorbed therein.

In this respect, the gas cooler/absorber stage preferably comprises a plurality of gas flow passages in parallel with one another as well as a plurality of flow passages in parallel with one another and conducting the hygroscopic solution. It is in particular of advantage in this respect if the flow passages of the gas cooler/absorber stage conducting the hygroscopic solution are respectively formed between two mutually adjacent gas flow passages.

Such embodiments are, however, generally also conceivable in which the flow passages of the gas cooler/absorber stage conducting the hygroscopic solution are respectively formed between a gas flow passage and an adjacent cooling unit.

The gas cooler stage/absorber stage can be supplied as gas, for example as inflow air. The dried gas, e.g. air, exiting the gas cooler/absorber stage can in particular be supplied to the combined absorber/solution cooler stage via an interposed cooler. The gas space or spaces of the absorber/solution cooler stage is/are preferably acted on by vacuum to assist the transport of the gas mixture coming from the heated absorber stage. The gas spaces of the absorber/solution cooler stage are expediently connected to a vacuum system with a condenser.

The respective portion of concentrated draw solution arising in the heated absorber stage can be supplied to the absorber/solution cooler stage via a cooler cooled by seawater, for example, in the case of seawater desalination.

The hygroscopic solution exiting the gas cooler/absorber stage is advantageously supplied to a regeneration stage in which it is regenerated, with the regenerated hygroscopic solution preferably in particular again being supplied to the gas cooler/absorber stage via a cooler.

It is in particular of advantage in this respect if the regeneration stage comprises at least one gas flow passage which is in particular flowed through by environmental air, as well as at least one flow passage which conducts the hygroscopic solution, wherein the inner space or gas space of a respective gas flow passage is at least partly bounded by a vapor-permeable, liquid-tight membrane wall and wherein at least one flow passage is provided which is formed between such a gas flow passage and a further such gas flow passage adjacent thereto and which conducts the hygroscopic solution such that moisture, in particular water vapor, is transferred from the hygroscopic solution via the membrane wall into the gas, in particular environmental air, conducted in the gas flow passage and the hygroscopic solution is concentrated.

The regeneration stage preferably comprises a plurality of gas flow passages in parallel with one another as well as a plurality of flow passages in parallel with one another and conducting the hygroscopic solution, wherein the flow passages of the regeneration stage conducting the hygroscopic solution are preferably respectively formed between two mutually adjacent gas flow passages.

The gas, e.g. environmental air, supplied to the regeneration stage can have previously been heated via a gas heater, optionally an air heater. The gas exiting the regeneration stage can be led off as exhaust air, for example.

In accordance with another advantageous practical embodiment of the system in accordance with the invention, the regeneration stage provided for regenerating the hygroscopic solution can also have a heating stage which is flowed through by the hygroscopic solution exiting the gas cooler/absorber stage and which comprises at least one heating unit and at least one evaporator unit, wherein a respective heating unit comprises a heating fluid space at least partly bounded by a fluid-tight, heat-conducting wall and a respective evaporator unit comprises a vapor space at least partly bounded by a vapor-permeable, liquid-tight membrane wall, and wherein at least one flow passage, which is formed between a heating unit and an evaporator unit adjacent thereto and which conducts the hygroscopic solution, is provided in the heating stage such that the hygroscopic solution is heated via the fluid-tight, heat-conducting wall and the vapor arising from the hygroscopic solution arrives in the vapor space through the membrane wall.

It is in particular also of advantage if the regeneration stage has at least one condensation/evaporation stage which is flowed through by the hygroscopic solution exiting the heating stage, which is supplied with vapor arising in the heating stage and which comprises at least one condensation unit and at least one evaporator unit, wherein a respective condensation unit comprises a first vapor space at least partly bounded by a condensation wall and a respective evaporator unit comprises a second vapor space at least partly bounded by a vapor-permeable, liquid-tight membrane wall, and wherein at least one flow passage, which is formed between such a condensation unit and such an evaporator unit adjacent thereto and which conducts the hygroscopic solution, is provided in a respective condensation/evaporation stage, such that the hygroscopic solution is heated via the condensation wall and the vapor arising from the hygroscopic solution arrives in the second vapor space through the membrane wall, with preferably the hygroscopic solution (70) exiting the last condensation/evaporation stage being again supplied to the gas cooler/absorber stage.

The regeneration stage preferably also comprises a condensation stage having at least one cooling unit and at least one condensation unit, wherein a respective cooling unit comprises a cooling fluid space preferably at least partly bounded by a fluid-tight, heat-conducting wall and a respective condensation unit comprises a vapor space at least partly bounded by a condensation wall and wherein at least one cooling unit is directly adjacent to at least one condensation unit in the condensation stage such that the condensation wall of the respective condensation unit is cooled via the cooling unit, and wherein vapor preferably arising in a preceding condensation/evaporator stage is supplied to the condensation stage.

If the regeneration stage serving for regenerating the hygroscopic solution comprises, as previously mentioned, a heating stage, at least one condensation/evaporation stage and a condensation stage, this regeneration stage is preferably again in a vacuum; the cooling fluid and the heating fluid are preferably at environmental pressure and the hygroscopic solution is preferably in a vacuum. In the condensation/evaporation stage(s) and in the heating stage, the hygroscopic solution can in particular be at the boiling temperature corresponding to the absolute pressure in the vapor space of a respective adjacent evaporator unit over all stages, as is described in WO 2007/054311 which is herewith included in the disclosure content of the present application.

The heating stage can in particular again be heated by solar power. The condensation stage can be cooled by cooling water or also by another cooling fluid. The distillate arising in a respective condensation unit can be led off. The gas spaces of the absorber/solution cooler stage and the at least one condensation unit of the regeneration stage serving for regenerating the hygroscopic liquid can again be connected to a vacuum system with a condenser, for example via a vacuum line.

In accordance with a preferred practical embodiment of the system in accordance with the invention, it is designed as a modular flow system having a plurality of frame elements. In this respect, the different functional units such as in particular a respective flow passage conducting the solution to be processed, a respective heating unit, a respective evaporator unit, a respective condensation unit, a respective cooling unit, a respective gas space and/or a respective gas passage can each be provided in the form of such a frame element.

The frame elements are preferably provided with web structures via which they can in particular be connected to one another for forming the forward osmosis device, a respective heating stage, a respective condensation/evaporation stage, a respective condensation stage, the heated desorber stage, the combined absorber/solution cooler stage, the gas cooler/absorber stage and/or the regeneration stage provided for regenerating the hygroscopic solution.

The frame elements can each comprise an inner region which is surrounded by an outer frame and which is preferably provided with an in particular grid-like spacer to whose two sides a respective corresponding functional surface, preferably in the form of a film or membrane, is in particular applied for forming a respective inner space, a respective heating fluid space, a respective vapor space, a respective cooling fluid space, a respective gas space or a respective inner space or gas space.

The web structures via which the individual frame elements, and optionally end-side plate elements, can be connected to one another can, for example, be welded web structures or bonded structures via which the frame elements are welded or bonded to one another. In the case of welded web structures, a friction welding process, a laser welding process and/or a heating element welding process can be used, for example, for connecting the frame elements.

The system in accordance with the invention can be designed in a particularly simple manner and can be varied in the desired manner using the frame elements in accordance with the invention. The frame elements or the units or stages obtained via them are characterized by a relatively simple shape and provide different possibilities for conducting solution, gas or air, cooling fluid and heating fluid, etc. Depending on the function, frame elements are inter alia conceivable which are each provided on both sides with a membrane, are each provided on both sides with a film, or are provided with a membrane on one side and with a film on the other side.

BRIEF DESCRIPTION OF THE DRAWINGS

The invention will be explained in more detail in the following with reference to embodiments and to the drawing; there are shown in this.

DETAILED DESCRIPTION

Figure 1:
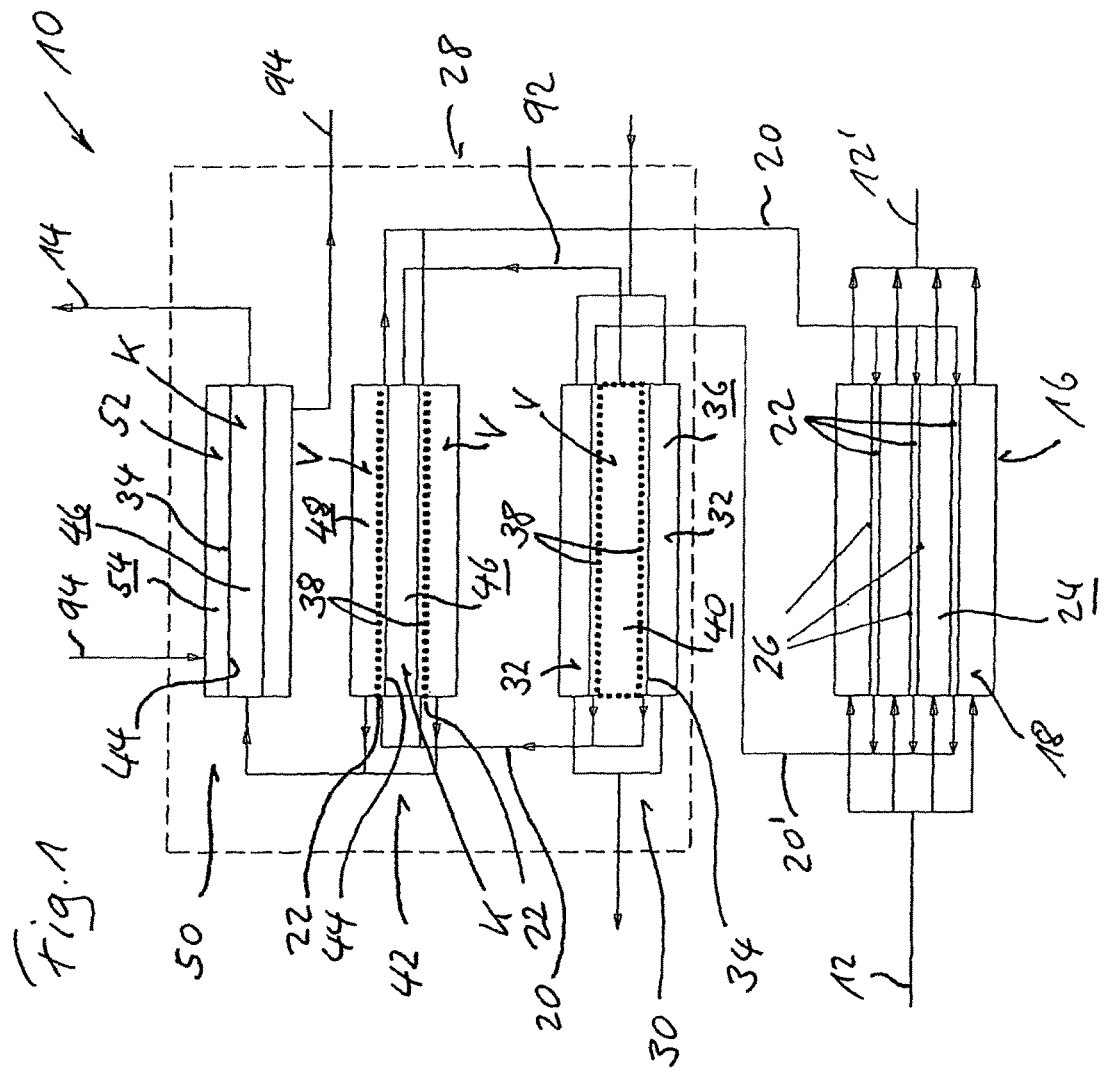
FIG. 1 a schematic representation of an exemplary embodiment of a system for separating a product contained as a solvent, e.g. water, in a solution to be processed such as seawater.

FIG. 1 shows in a schematic representation an exemplary embodiment of a system 10 for separating a product 14 contained as a solvent in a solution 12 to be processed. In this respect, the solution 12 to be processed can, for example, be seawater and the product 14 can, for example, be water.

The system 10 comprises at least one forward osmosis device 16 flowed through by the solution 12 to be processed and by a draw solution 20 as well as a device 28 connected downstream thereof for recovering the product 14 from diluted draw solution 20' exiting the forward osmosis device 16.

The forward osmosis device 16 comprises at least one flow passage 18 conducting the solution 12 to be processed and at least one flow passage 22 conducting the draw solution 20.

In this respect, the inner space 24 of a respective flow passage 18 conducting the solution 12 to be processed is at least partly bounded by a semipermeable membrane wall 26 permeable for the solvent of the solution 12 to be processed, but not for the substance, e.g. seawater, dissolved therein. In addition, at least one flow passage 22 conducting the draw solution 20 is bounded on mutually oppositely disposed sides by membrane walls 26 which are associated with two adjacent flow passages 18 conducting the solution 12 to be processed such that solvent from the solution 12 to be processed arrives in the adjacent flow passages 22 conducting the draw solution 20 through the membrane walls 26. The concentrated solution 12' to be processed, e.g. concentrated seawater, exiting the forward osmosis device 16 can be led off.

The draw solution 20 can flow through the forward osmosis device 16 in counter-flow or also in parallel flow to the solution 12 to be processed.

As can be recognized with reference to FIG. 1, the forward osmosis device 16 can comprise a plurality of flow passages 18 in parallel with one another and conducting the solution to be processed as well as a plurality of flow passages 22 in parallel with one another and conducting the draw solution 20.

In this respect, the flow passages 22 conducting the draw solution 20 can each be bounded on mutually oppositely disposed sides by membrane walls 26 which are associated with two adjacent flow passages 18 conducting the solution 12 to be processed.

As can again likewise be recognized with reference to FIG. 1, the product recovery device 28 can have a heating stage 30 flowed through by the diluted draw solution 20' exiting the forward osmosis device 16. Such a heating stage 30 comprises a heating unit 32 and at least one evaporator unit V. In this respect, a respective heating unit 32 comprises a heating fluid space 36 at least partly bounded by a fluid-tight, heat-conducting wall 34 and a respective evaporator unit V comprises a vapor space 40 at least partly bounded by a vapor-permeable, liquid-tight membrane wall 38. At least one flow passage 22, which is formed between a heating unit 32 and an evaporator unit V adjacent thereto and which conducts the draw solution 20, is provided in the heating stage 30 such that the draw solution 20 is heated via the fluid-tight, heat-conducting wall 34 and the vapor arising from the draw solution 20 arrives in the vapor space 40 through the membrane wall 38.

The product recovery device 28 can additionally have at least one condensation/evaporation stage 42 flowed through by the draw solution 20 exiting the heating stage 30 and supplied with vapor 92 arising in the heating stage 30. Such a condensation/evaporation stage 42 comprises at least one condensation unit K and at least one evaporator unit V. A respective condensation unit K comprises a first vapor space 46 at least partly bounded by a condensation wall 44, while a respective evaporator unit V comprises a second vapor space 48 at least partly bounded by a vapor-permeable, liquid-tight membrane wall 38.

In this respect, at least one flow passage 22, which is formed between such a condensation unit K and such an evaporator unit V adjacent thereto and which conducts the draw solution 20, is provided in a respective condensation/evaporation stage 42 such that the draw solution 20 is heated via the condensation wall 44 and the vapor arising from the draw solution 20 arrives in the second vapor space 48 through the membrane wall 38. The draw solution 20 exiting the last condensation/evaporation stage 42 can again be supplied to the forward osmosis device 16.

As can likewise be seen from FIG. 1, the product recovery device 28 can additionally comprise a condensation stage 50 having at least one cooling unit 52 and at least one condensation unit K. A respective cooling unit 52 comprises a cooling fluid space 54 preferably at least partly bounded by a fluid-tight, heat-conducting wall 34 while a respective condensation unit K comprises a vapor space 46 at least partly bounded by a condensation wall 44.

At least one cooling unit 52 is directly adjacent to at least one condensation unit K in the condensation stage 50 such that that the condensation wall 44 of the respective condensation unit K is cooled via the cooling unit 52.

Vapor arising in a preceding condensation/evaporation stage 42 can be supplied to the condensation stage 50. The product 14 is then in particular led off from the condensation stage 50 in the form of the distillate arising in the condensation stage 50.

The product recovery device 28 comprising the heat stage 30, the at least one condensation/evaporation stage 42 and preferably also the condensation stage 50 and marked by a dashed line is preferably in a vacuum; the cooling fluid and the heating fluid are preferably at environmental pressure and the draw solution 20 is preferably in a vacuum. The draw solution 20 can in particular be at the boiling temperature corresponding to the absolute pressure in the vapor space of a respective adjacent evaporator unit over all stages in the condensation/evaporation stages 42 and in the heating stage 50, as is described in WO 2007/054311.

A respective heating unit 32 can be flowed through by a heating fluid which is, for example, heated by solar power.

The condensation stage 50 can be cooled by a cooling fluid 94, for example cooling water.

A forward osmosis device can therefore, for example, be combined with a product recovery device comprising e.g. a heating stage, at least one condensation/evaporation stage and a condensation stage. The forward osmosis device can be built up of frame elements and, optionally, end-side plate elements, which are provided with membranes suitable for forward osmosis. Passages for the solution to be processed and for the draw solution are formed on the setting up of the frame stacks or plate stacks. The solution to be processed and the draw solution can flow in counter-flow or also in parallel flow.

The forward osmosis device can be immersed into the solution to be processed, e.g. seawater, or it can be flowed through externally by the solution to be processed. If the forward osmosis device is immersed into the solution to be processed, provision must expediently be made that it flows along the membranes to avoid a concentration polarization.

The draw solution diluted by the product, here water, for example, can be supplied to a concentration device comprising a heating stage, at least one condensation/evaporation stage and a condensation stage.

The previously described concentration process can in particular also be replaced with other processes such as in particular reverse osmosis, an MSF process, an MED process or an MFC process on the desalination of seawater.

In addition to saline solutions, solutions with organic compounds such as sugar can also be used. If these organic compounds are long-chain compounds and if they do not have any vapor pressure, it is desirable that they are so large that the product, e.g. water on a seawater desalination, can be separated via a microfiltration or ultrafiltration membrane. In this case, the water is the permeate. The unit for recovering the product and for concentrating the draw solution can in particular be made up of frame elements provided with web structures.

Solutions can in particular also be used as draw solutions which can be both separated and regenerated via the vapor pressure, with e.g. ammonium hydrogen carbonate dissolved in water e.g. being named. Ammonium hydrogen carbonate can be dissolved in water such that a corresponding draw solution is obtained. If this solution is heated, gaseous $NH_3$ and $CO_2$ is released. Pure water remains.

Figure 2:
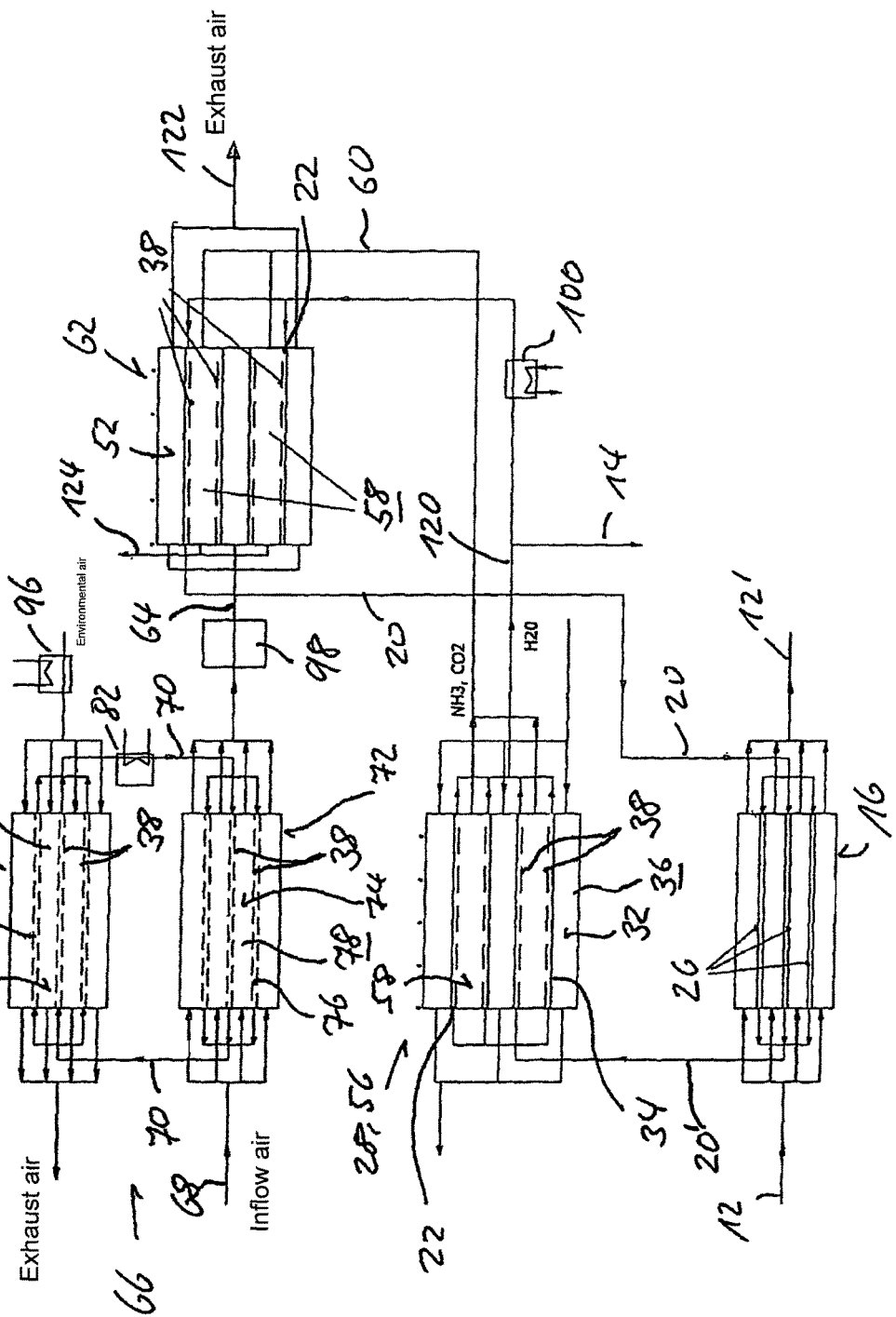
FIG. 2 a schematic representation of an exemplary embodiment of a system for separating a product contained as a solvent, e.g. water, in a solution to be processed such as seawater having a heated desorber stage, a combined absorber/solution cooler stage and a gas drying/cooling device having a gas cooler/absorber stage flowed through by a hygroscopic solution and having a regeneration stage serving for regenerating the hygroscopic solution.

FIG. 2 shows in an exemplary embodiment a system 10 for separating a product 14 contained as a solvent, e.g. water, in a solution 12 to be processed such as seawater having a heated desorber stage 56, a combined absorber/solution cooler stage 62 and a gas drying/cooling device 66 having a regeneration stage 80 flowed through by a hygroscopic solution 70 and serving for regenerating the hygroscopic solution 70.

As can be seen from FIG. 2, the product recovery device 28 can e.g. have a heated desorber stage 56 which is flowed through by the diluted draw solution 20' exiting the forward osmosis device 16 and which comprises at least one gas space 58 as well as at least one flow passage 22 conducting the diluted draw solution 20'.

In this respect, a respective gas space 58 is at least partly bounded by a vapor-permeable, liquid-tight membrane wall 38. At least one flow passage 22 is provided which is formed between such a gas space 58 and a heating unit 32 adjacent thereto and which conducts the diluted draw solution 20' such that the gas mixture 60 expelled from the diluted draw solution 20' arrives in the gas space 58 through the membrane wall 38 and the product 14 can preferably be led off in the form of draw solution 120 which exits the heated desorber stage 56, which is purified from the gas mixture 60 and which can be pure water in the case of seawater desalination, for example.

In this respect, a respective heating unit 32 can comprise a heating fluid space 36 at least partly bounded by a fluid-tight, heat-conducting wall 34.

Some of the draw solution 120 exiting the heated desorber stage 56, purified of the gas mixture 60 and in particular present in the form of pure water and the gas mixture 60 separated in the heated desorber stage 56 can be supplied to a combined absorber/solution cooler stage 62 for generating regenerated draw solution 20. The regenerated draw solution 20 obtained through this absorber/solution cooler stage 62 can again be supplied to the forward osmosis device 16.

The absorber/solution cooler stage 62 can comprise at least one gas space 58 preferably acted on by vacuum and containing gas mixture 60 from the heated desorber stage 56 and can also comprise at least one flow passage 22 conducting the draw solution 120 purified of the gas mixture 60. In this respect, a respective gas space 58 is at least partly bounded by a vapor-permeable, liquid-tight membrane wall 38.

In addition, at least one flow passage 22 is provided which is formed between such a gas space 58 and a cooling unit 52 adjacent thereto and which conducts the purified draw solution 20 such that the gas mixture flows from the gas space 58 through the membrane wall 38 into the flow passage 22 conducting the purified draw solution 120 and is dissolved in the purified draw solution 120 cooled by the cooling unit 52.

As can additionally be seen from FIG. 2, a device 66 for drying and cooling gas 68, for example air, in particular inflow air, by means of a hygroscopic solution 70 can be provided for supplying the absorber/solution cooler stage 62 or its cooling units 52 with cooling fluid 64, e.g. cold air.

The gas drying/cooling device 66 can in particular have a gas cooler/absorption stage 72 having at least one gas flow passage 74 as well as at least one flow passage 76 conducting the hygroscopic solution 70. In this respect, the inner space or gas space 78 of a respective gas flow passage 74 is at least partly bounded by a vapor-permeable, liquid-tight membrane wall 38.

At least one flow passage 76 is provided which is formed between such a gas flow passage 74 and a further such gas flow passage 74 adjacent thereto and which conducts the hygroscopic solution 70 such that moisture, in particular water vapor, is transferred from the gas 68 via the membrane wall 38 into the hygroscopic solution 70 and is absorbed therein.

The gas cooler/absorber device 72 can in particular comprise a plurality of gas flow passages 74 in parallel with one another as well as a plurality of flow passages 76 in parallel with one another and conducting the hygroscopic solution 70.

In this respect, the flow passages 76 of the gas cooler/absorber stage 72 conducting the hygroscopic solution 70 can in particular respectively be formed between two mutually adjacent gas flow passages 74.

As can additionally be seen from FIG. 2, the hygroscopic solution 70 exiting the gas cooler/absorber stage 72 can be supplied to a regeneration stage 80 in which it is regenerated. The regenerated hygroscopic solution 70 can in particular again be supplied to the gas cooler/absorber stage 72 via a cooler 82.

The regeneration stage 80 can comprise at least one gas flow passage 74 in particular flowed through by environmental air and can also comprise at least one flow passage 76 conducting the hygroscopic solution 70.

In this respect, the inner space or gas space 78 of a respective gas flow passage 74 is at least partly bounded by a vapor-permeable, liquid-tight membrane wall 38.

At least one flow passage 76 is provided which is formed between such a gas flow passage 74 and a further such gas flow passage 75 adjacent thereto sand which conducts the hygroscopic solution 70 such that moisture, in particular water vapor, is transferred from the hygroscopic solution 70 via the membrane wall 38 into the gas, in particular environmental air, conducted into the gas flow passage 74 and the hygroscopic solution 70 is concentrated.

The regeneration stage 80 can in particular comprise a plurality of gas flow passages 78 in parallel with one another as well as a plurality of flow passages in parallel with one another and conducting the hygroscopic solution 70. In this respect, the flow passages 76 of the regeneration stage 80 conducting the hygroscopic solution 70 can in particular respectively be formed between two mutually adjacent gas flow passages 74.

The hygroscopic solution 70 exiting the regeneration stage 80 can be conducted back to the gas cooler/absorption stage 72 via a cooler 82. The gas, e.g. environmental air, can be supplied to the regeneration stage 80 via a gas heater 96, optionally an air heater. The gas exiting the regeneration stage 80 can therefore in particular be led off as exhaust air.

The gas 68 supplied to the gas cooling/absorber stage 72 can in particular be inflow air. The gas, e.g. dried air, exiting the gas cooler/absorber stage 72 can be supplied to the absorber/solution cooler stage 62 via a cooler 98. The absorber/solution cooler stage 62 is therefore supplied with cool gas or cool air. The gas again exiting the absorber/solution cooler stage 62 can be led off as exhaust gas or exhaust air 122.

The respective portion of the purified draw solution 120 or pure water exiting the heated desorber stage 56 can be supplied to the absorber/solution cooler stage 62 via a cooler 100, with seawater optionally being able to be used for cooling.

The forward osmosis device 16 can in particular again at least essentially be designed like the forward osmosis device 16 described with reference to FIG. 1.

The forward osmosis process can in particular be carried out using sodium hydrogen carbonate with this system described with reference to FIG. 2. Seawater and the draw solution can thus e.g. be conducted in counter-flow in the forward osmosis device 16, for example. Water e.g. flows through the semipermeable membrane walls at the osmotic pressure of the draw solution into the draw solution such that the latter is diluted. The diluted draw solution 20' flows in the desorber stage 52 heated e.g. by solar energy. Said desorber stage contains passages for the diluted draw solution 20' and for the heating fluid as well as for the expelled gases, here $NH_3$ and $CO_2$, for example, with water vapor being contained in this gas mixture in accordance with its vapor pressure.

The distillate purified, for example, of the gases $NH_3$ and $CO_2$ and recovered in the desorber 56 is expelled from the circuit.

Due to its pressure gradient, the gas mixture 60 flows to the combined absorber/solution cooler stage 62. It comprises passages for air, for example, which may in particular be bounded by films; passages for the gas mixture which may be bounded by a water-tight, vapor-permeable membrane; as well as passages for the purified draw solution 120 which may be delineated from the adjacent passage on one side respectively by a membrane and on the other side respectively by a film. Gas mixture 60 and draw solution 120 purified of the gas mixture 60, for example pure water, flow from the heated desorber stage 56 toward the absorber/solution cooler stage 62 in parallel flow, for example.

The purified draw solution 120 or the water can be precooled on the way to the absorber/solution cooler stage 62 via a cooler or heat exchanger 100.

Cooling fluid 64, here cold air, for example, in particular flows toward the absorber/solution cooler stage in counterflow to the gas mixture and water. In the system shown in FIG. 2, inflowing air comes, for example, as dried air from the gas cooler/absorber stage 72 and can then be further cooled via an interposed cooler 98, here an air cooler, for example.

$NH_3$ and $CO_2$, for example, flow from the passage for the gas mixture 60 through the microporous, water-tight membranes of the absorber/solution cooler stage 62 and are dissolved in the water which is cooled here, for example, by the airflow. The volume reduction of the gas mixture by absorption of $NH_3$ and $CO_2$ ensures that gas mixture always flows on from the heated desorber stage 56. The water vapor remaining in the passage can be supplied via a vacuum system 124 to a condenser and can be condensed there. This vacuum system also results in a flowing of the gas mixture from the heated desorber stage 56 to the combined absorber/solution cooler stage 62. A new draw solution 20 exits the latter and can again be supplied to the forward osmosis device 16.

The air supplied to the combined absorber/solution cooler stage comes from the gas cooler/absorber stage 72 to which the regeneration stage 80 serving for regenerating the hygroscopic solution 70 can be connected in parallel. Gas 68, here air for example, can be dried in this circuit by the hygroscopic liquid 70 in the gas cooler/absorber stage 72. The hygroscopic solution 70 diluted by the taking up of the water vapor can be supplied to the regeneration stage 80 in particular acting as a desorber for concentration. After the desorption of the previously taken up water vapor, the hygroscopic liquid 70 can, for example, be cooled in the cooler 82 before it is again supplied to the gas cooler/absorber stage 72 for drying the gas 68 or air.

As can be seen from FIG. 2, the total diluted draw solution 20' exiting the forward osmosis device 16 can, for example, be supplied to the heated desorber stage 56. In this case, some of the draw solution 120 exiting the desorber stage 56 purified of the gas mixture 60, in particular pure water, can be supplied to the combined absorber/solution cooler stage 62 for regenerating regenerated draw solution 20. The diluted draw solution 20' exiting the forward osmosis device 16 and supplied to the heated desorber stage 56 therefore exits the heated desorber stage 56 as draw solution 120 purified of the gas mixture 60, in particular as pure water. Some of this draw solution 120 purified of the gas mixture 60 or some of this pure water serves as a basis for the draw solution 20 to be formed again in the absorber/solution cooler stage 62.

Figure 3:
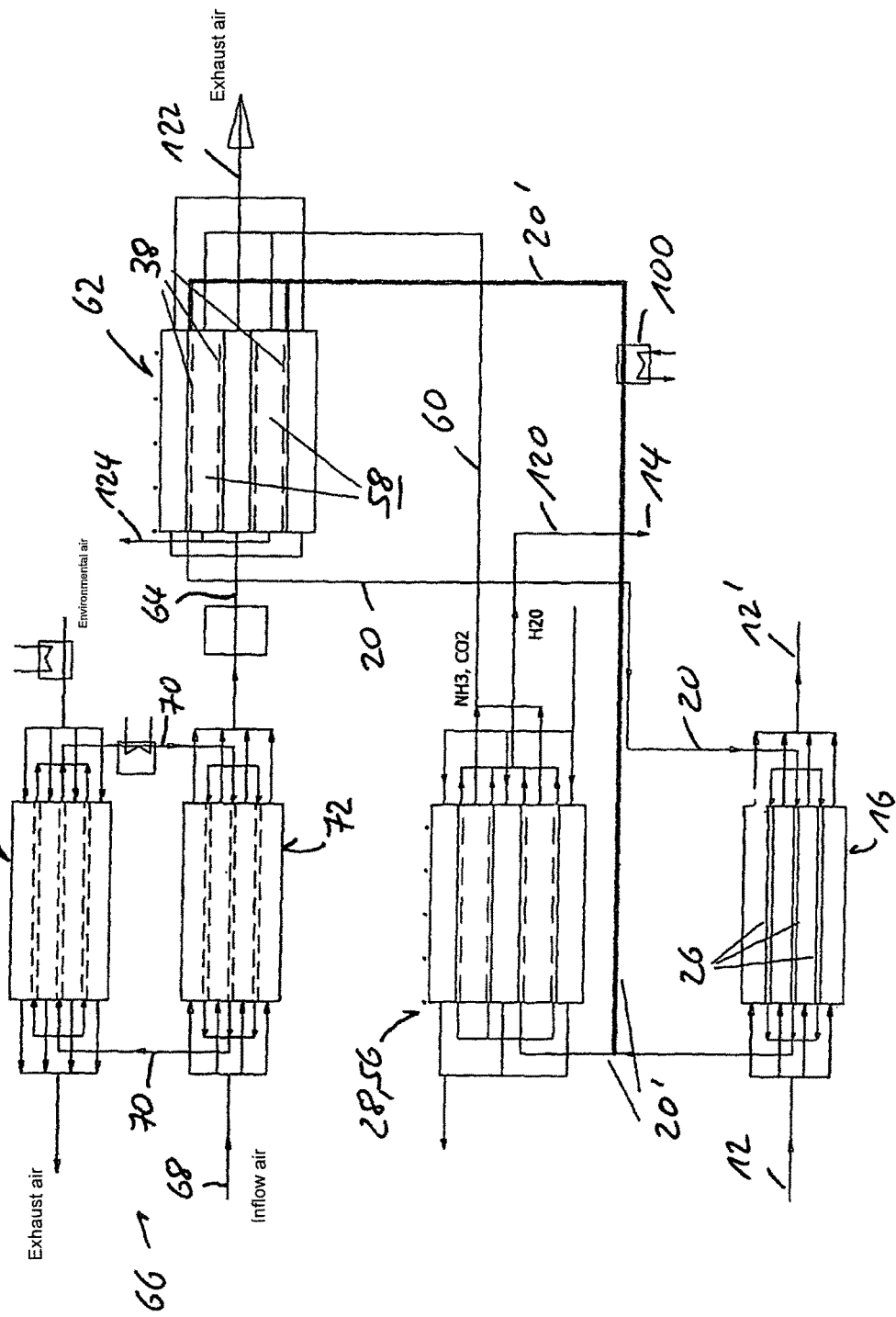
FIG. 3 an exemplary embodiment of the system comparable with the embodiment in accordance with FIG. 2 in which, however, only the product flow is liberated from the gas mixture in the heated desorber stage.

FIG. 3 shows an exemplary embodiment of the system 10 comparable with the embodiment in accordance with FIG. 2 in which, however, only the product flow is liberated from the gas mixture 60 in the heated desorber stage 56. In this case, some of the diluted draw solution 20' exiting the forward osmosis device 16 is supplied to the combined absorber/solution cooler stage 62 for new formation of the draw solution 20. In this respect, in particular only such a part quantity of the diluted draw solution 20'' exiting the forward osmosis device 16 is supplied to the heated desorber stage 56 by which the mass of the concentrated draw solution 20 increased on flowing through the forward osmosis device 16. The gas mixture 60, here $NH_3$ and $CO_2$, is now separated from this additional volume flow in the heated desorber stage 56 to form the product 14. The remaining part quantity of diluted draw solution 20' from the forward osmosis device 16 is supplied to the combined absorber/solution cooler stage 62. The separated gas mixture 60 or $NH_3$, $CO_2$, is then supplied to this remaining part quantity of diluted draw solution 20' in the absorber/solution cooler stage 62.

In another respect, this embodiment of the system 10 described with reference to FIG. 3 can in particular again at least substantially have the same design as the system described with reference to FIG. 2. Mutually corresponding parts have the same reference numerals associated with them.

Figure 4:
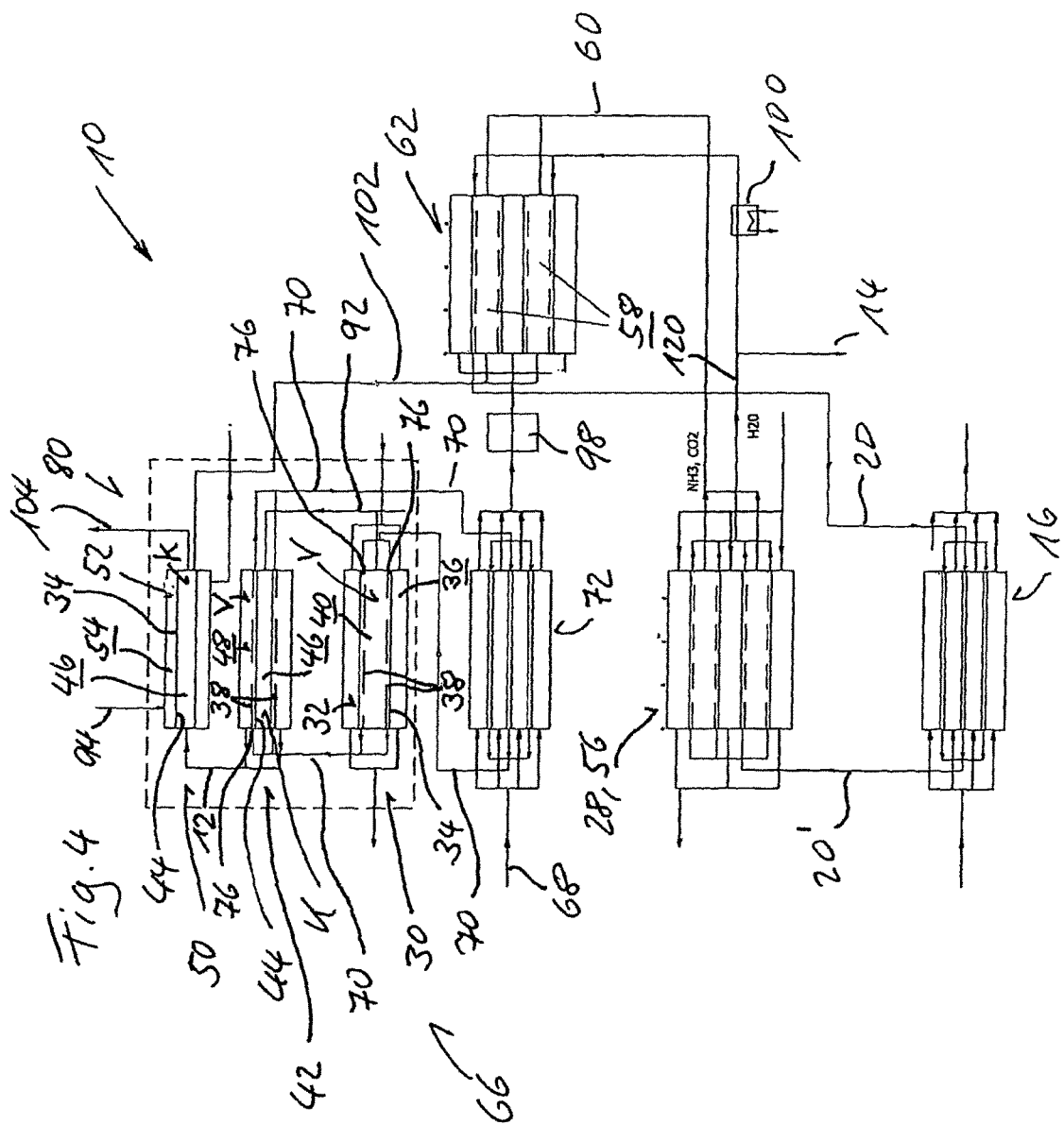
FIG. 4 an exemplary embodiment of the system comparable with the embodiment in accordance with FIG. 2 with an alternative regeneration stage serving for the regeneration of the hygroscopic solution.

FIG. 4 shows an exemplary embodiment of the system 10 comparable with the embodiment in accordance with FIG. 2 having an alternative regeneration stage 80 serving for regenerating the hygroscopic solution.

As can be seen from this FIG. 4, the regeneration stage 80 provided for regenerating the hygroscopic solution 70 can alternatively have a heating stage 30 which is flowed through by the hygroscopic solution 70 exiting the gas cooler/absorber stage 72 and which comprises at least one heating unit 32 and at least one evaporator unit V, wherein a respective heating unit 32 comprises a heating fluid space 36 at least partly bounded by a fluid-tight, heat-conducting wall 34 and a respective evaporator unit V comprises a vapor space 40 at least partly bounded by a vapor-permeable, liquid-tight membrane wall 38.

At least one flow passage 76, which is formed between a heating unit 32 and an evaporator unit V adjacent thereto and which conducts the hygroscopic solution 70, is provided in the heating stage 30 such that the hygroscopic solution 70 is heated via the fluid-tight, heat-conducting wall 34 and the vapor arising from the hygroscopic solution 70 arrives in the vapor space 40 through the membrane wall 38.

The regeneration stage 80 can also have at least one condensation/evaporation stage 42 which is flowed through by the hygroscopic solution 70 exiting the heating stage 30 and supplied with vapor 92 arising in the heating stage 30 and which comprises at least one condensation unit K and at least one evaporator unit V.

A respective condensation unit K comprises a first vapor space 46 at least partly bounded by a condensation wall 44, while a respective evaporator unit V comprises a second vapor space 48 at least partly bounded by a vapor-permeable, liquid-tight membrane wall 38.

At least one flow passage 76, which is formed between such a condensation unit K and such an evaporator unit V adjacent thereto and which conducts the hygroscopic solution 70, is provided in a respective condensation/evaporation stage 42 such that the hygroscopic solution 70 is heated via the condensation wall 44 and the vapor arising from the hygroscopic solution 70 arrives in the second vapor space 48 through the membrane wall 38.

The hygroscopic solution 70 exiting the last condensation/evaporation stage 42 can in particular again be supplied to the gas cooler/absorber stage 72 via a cooler.

As can additionally be seen from FIG. 4, the regeneration stage 80 can moreover comprise a condensation stage 50 having at least one cooling unit 52 and at least one condensation unit, wherein a respective cooling unit 52 comprises a cooling fluid space 54 preferably at least partly bounded by a fluid-tight, heat-conducting wall and a respective condensation unit K comprises a vapor space 46 at least partly bounded by a condensation wall 44.

At least one cooling unit 52 is directly adjacent to at least one condensation unit K in the condensation stage 50 such that that the condensation wall 44 of the respective condensation unit K is cooled via the cooling unit 52.

Vapor 92 arising in a preceding condensation/evaporation stage 42 can be supplied to the condensation stage 50.

The regeneration stage 80 marked by a dashed line in FIG. 4 and comprising a heating stage 30, at least one condensation/evaporation stage 42 and preferably a condensation stage 50 is preferably in a vacuum; the cooling fluid and the heating fluid are preferably at environmental pressure and the hygroscopic solution 70 is preferably in a vacuum. In the condensation/evaporation stage(s) 42 and in the heating stage 30, the hygroscopic solution 70 can in particular be at the boiling temperature corresponding to the absolute pressure in the vapor space of a respective adjacent evaporator unit V over all stages, as is described in WO 2007/054311.

The heating stage 30 can in particular be flowed through by a heating fluid heated by solar power, for example.

The gas spaces 58 of the absorber/solution cooler stage 62 and the vapor space 46 of the condensation stage 50 can be connected, for example, via a vacuum line 102 to a vacuum system and to a condenser. The condensation stage 50 is cooled via a cooling fluid 94, here water for example. Distillate arising in the vapor space 46 of the condensation stage 50 can be led off via a line 104, for example.

In another respect, this system described with reference to FIG. 4 can in particular again at least substantially be designed as was described with reference to FIG. 2 or 3. Mutually corresponding parts have the same reference numerals associated with them.

In particular a solution can again be used as a draw solution for this system described with reference to FIG. 4 which can be separated and regenerated via vapor pressure differences.

Figure 5:
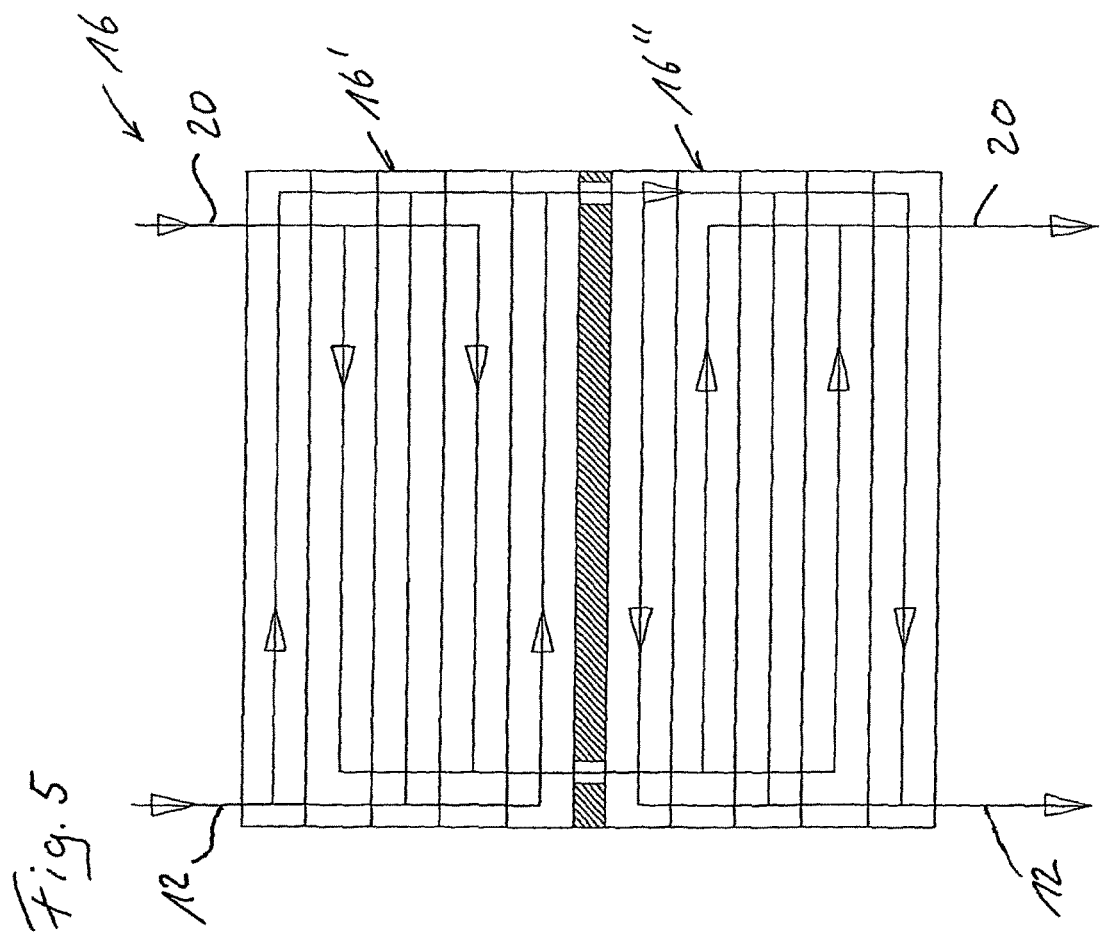
FIG. 5 a schematic representation of an exemplary embodiment of a forward osmosis device in the form of a parallel flow/counter flow exchanger with e.g. two forward osmosis units connected after one another.

FIG. 5 shows in a schematic representation an exemplary embodiment of a forward osmosis device 16 in the form of a parallel flow/counter-flow exchanger having e.g. two forward osmosis units 16', 16" connected after one another.

As can be recognized with reference to FIG. 5, the solution 12 to be processed, e.g. seawater, and the draw solution or forward osmosis solution 20 are supplied at one side of the two-stage forward osmosis device 16. The solutions flow toward one another in every stage or unit 16', 16".

Figure 6:
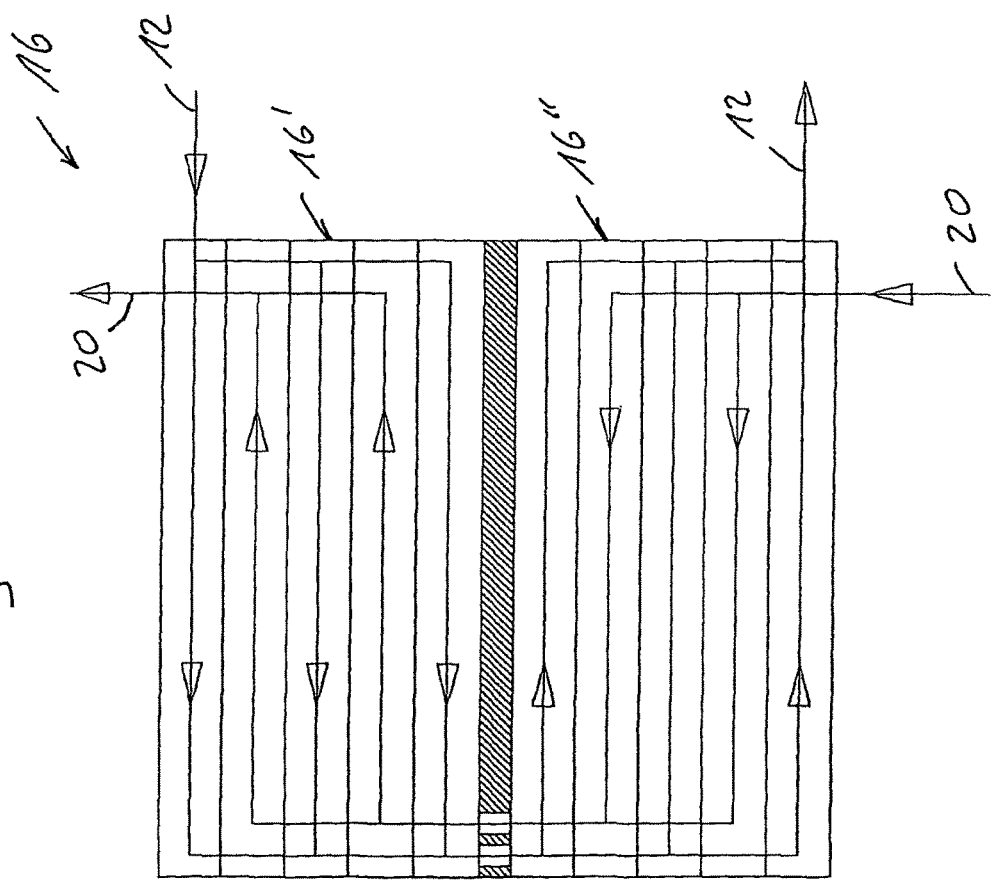
FIG. 6 a schematic representation of an exemplary embodiment of a forward osmosis device in the form of a counter-flow exchanger with e.g. two forward osmosis units connected after one another.

FIG. 6 shows in a schematic representation an exemplary embodiment of a forward osmosis device 16 in the form of a counter-flow exchanger having e.g. two forward osmosis units 16', 16" connected after one another. The solution 12 to be processed, e.g. seawater, and the draw solution or forward osmosis solution 20 are supplied at different sides of the two-stage forward osmosis device 16. The solutions flow toward one another in every stage or unit 16', 16".

Figure 7:
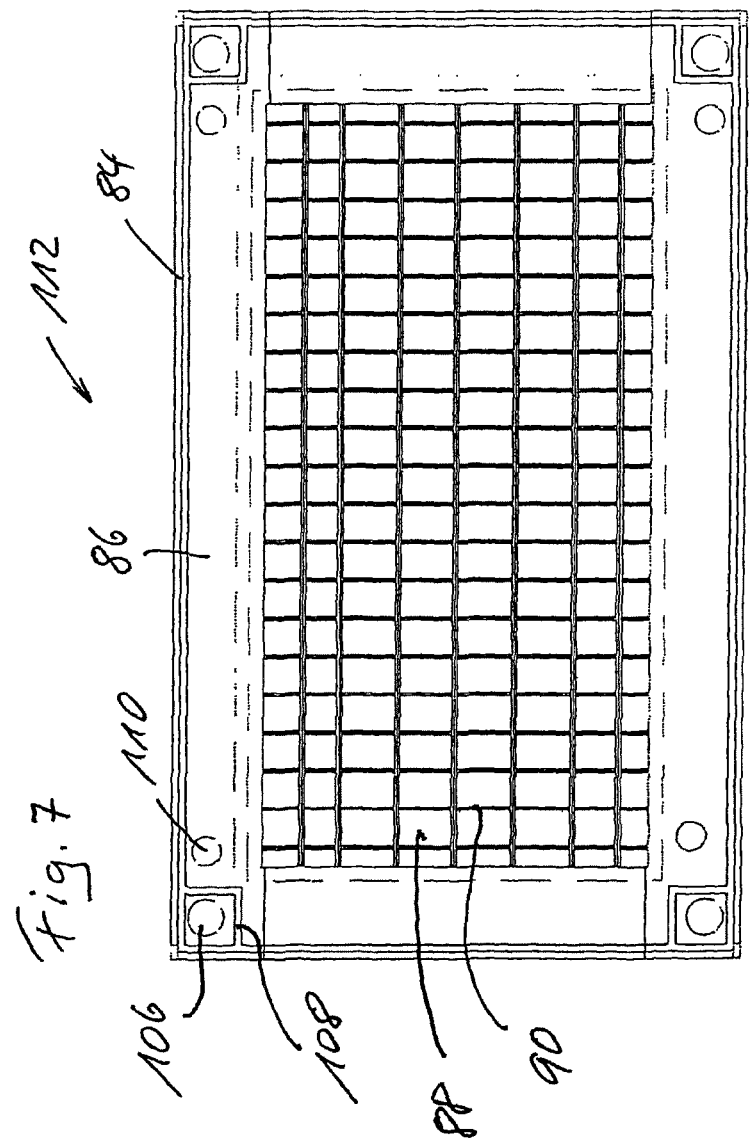
FIG. 7 a schematic representation of an exemplary embodiment of a frame element.

The system 10 in accordance with the invention for separating a product 14 contained as a solvent in a solution 12 to be processed can in particular be configured as a modular flow system having a plurality of frame elements 112 and, optionally, in particular end-side plate elements 114 (see also FIGS. 6 and 7). In this respect, the different functional units such as in particular a respective flow passage 18 conducting the solution 12 to be processed, a respective heating unit 32, a respective evaporator unit V, a respective condensation unit K, a respective cooling unit 52, a respective gas space 58 and/or a respective gas passage 74 can each be provided in the form of such a frame element.

Figure 8:
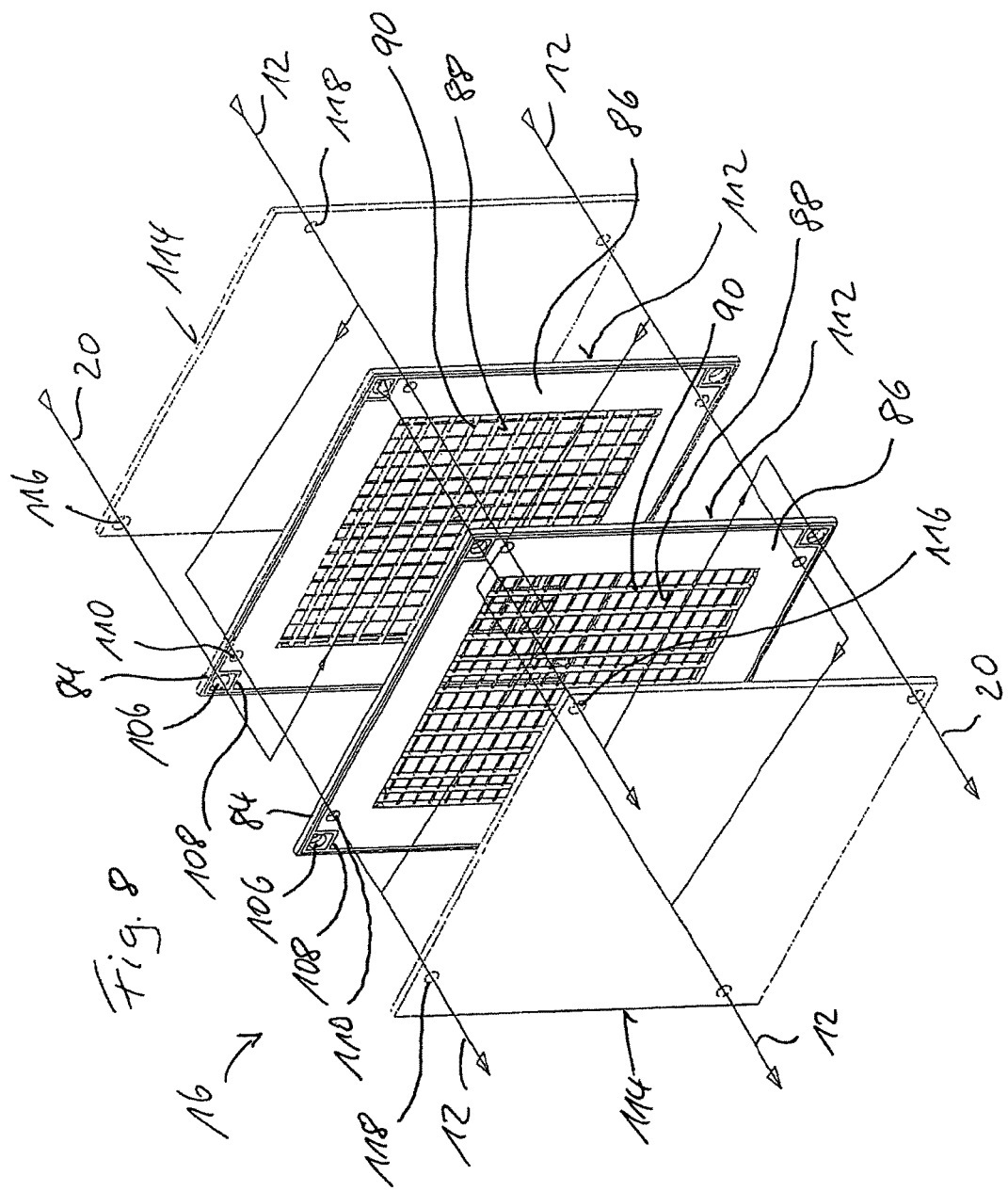
FIG. 8 a schematic, exploded representation of an exemplary realization of the forward osmosis device in accordance with FIG. 6 provided in the form of a counter-flow exchanger e.g. using frame elements of the kind shown in FIG. 7 and using e.g. end-side plate elements.

In this respect, the frame elements 112 can, such as can in particular also be recognized with reference to FIGS. 7 and 8, be provided with web structures 84 via which they can in particular be connected to one another for forming the forward osmosis device 16, a respective heating stage 30, a respective condensation/evaporation stage 42, a respective condensation stage 50, the heated desorber stage 56, the combined absorber/solution cooler stage 62, the gas cooler/absorber stage 72 and/or the regeneration stage 80 provided for regenerating the hygroscopic solution 70.

The frame elements 112 can, as likewise again visible from FIGS. 7 and 8, each comprise an inner region 88 which is surrounded by an outer frame 86 and which can be provided with an in particular grid-like spacer 90 to whose two sides in particular a respective corresponding functional surface, preferably in the form of a film or membrane, is applied for forming a respective inner space 24, a respective heating fluid space 36, a respective vapor space 40, 46, 48, a respective cooling fluid space 54, a respective gas space 58 or a respective inner space or gas space 78.

In this respect, depending on the function to be satisfied, a respective frame element can be provided on both sides with a respective membrane, on both sides with a respective film or on the one side with a membrane and on the other side with a film.

The web structures 84 via which the individual frame elements 112 can be connected to one another can, for example, be welded web structures or bonded structures via which the frame elements are welded or bonded to one another. In the case of welded web structures, a friction welding process, a laser welding process and/or a heating element welding process can be used, for example, for connecting the frame elements. The system in accordance with the invention can be designed in a particularly simple manner and can be varied in the desired manner using the frame elements in accordance with the invention. The frame elements or the devices, units or stages obtained via them are characterized by a relatively simple form and provide different possibilities of the solution supply, gas supply or air supply, cooling fluid supply and heating fluid supply.

FIG. 7 shows in a schematic representation an exemplary embodiment of a frame element 112 having an inner region 88 which is surrounded by an outer frame 86 and which is provided with a spacer 90 which is grid-like in the present case, for example. As already stated, a respective corresponding functional surface, in particular in the form of a film or membrane, can be applied to the two sides of such a frame element 112.

The frame element 112 is here provided e.g. in the corner regions with leadthroughs 106 which are each delineated by a web section 108 from the inner region 88. A respective further leadthrough 110 is provided in the region of these leadthroughs. As can be recognized with reference to FIG. 6, these leadthroughs 110 are, unlike the leadthroughs 106, not delineated by an additional web section 108.

FIG. 8 shows in a schematic, exploded representation an exemplary realization of the forward osmosis device 16 provided in the form of a counter-flow exchanger in accordance with FIG. 6 using frame elements of the kind shown in FIG. 7. In this respect, mutually corresponding parts have the same reference numerals associated with them.

As can be recognized with reference to FIG. 8, two such frame element 112 are provided between two end-side plate elements 114.

In the present case, the two frame elements 112 are, for example, each provided with membranes (not shown) at both sides. The frame elements 112, and preferably also the plate elements 114, are connected to one another via web structures 84.

As can be recognized with respect to FIG. 8, the plate elements 114 are also provided with leadthroughs 116, 118. In this respect, the leadthroughs 116 of the plate elements 114 can be aligned in the assembled state with the leadthroughs 106 of the frame elements 112 and the leadthroughs 118 of the plate elements 114 can be aligned with the leadthroughs 110 of the frame elements 112. The course of the solution 12 to be processed as well as of the draw solution 20 through the assembled forward osmosis device is shown schematically by corresponding lines.

REFERENCE NUMERAL LIST 10 system
12 solution to be processed
12' concentrated solution to be processed
14 product
16 forward osmosis device
16' forward osmosis unit
16' forward osmosis unit
18 flow passage conducting solution to be processed
20 draw solution
20' diluted draw solution
22 flow passage conducting draw solution
24 inner space
26 semipermeable forward osmosis membrane wall
28 product recovery device
30 heating stage
32 heating unit
34 fluid-tight, heat-conducting wall
36 heating fluid space
38 vapor permeable or gas-permeable, liquid-tight membrane wall
40 vapor space
42 condensation/evaporation stage
44 condensation wall
46 first vapor space
48 second vapor space
50 condensation stage
52 cooling unit
54 cooling fluid space
56 heated desorber stage
58 gas space
60 gas mixture
62 combined absorber/solution cooler stage
64 cooling fluid
66 gas drying device/cooling device
68 gas
70 hygroscopic solution
72 gas cooler/absorber stage
74 gas flow passage
76 flow passage conducting hygroscopic solution
78 inner space or gas space
80 regeneration stage
82 cooler
84 web structure
86 outer frame
88 inner region
90 spacer
92 vapor
94 cooling fluid
96 gas heater
98 cooler
100 cooler
102 vacuum line
104 line
106 leadthrough
108 web section
110 leadthrough
112 frame element
114 plate element
116 leadthrough
118 leadthrough
120 purified draw solution
122 exhaust gas, exhaust air
124 vacuum system
K condensation unit
V evaporator unit

The invention claimed is:

1. A system (10) for separating a product (14) contained as a solvent in a solution (12) to be processed, having at least one forward osmosis device (16) flowed through by the solution (12) to be processed and by a draw solution (20) and having a product recovery device (28) connected downstream thereof for recovering the product (14) from diluted draw solution (20') exiting the forward osmosis device (16), wherein the forward osmosis device (16) comprises at least one flow passage (18) conducting the solution (12) to be processed and at least one flow passage (22) conducting the draw solution (20), wherein the inner space (24) of a respective flow passage (18) conducting the solution (12) to be processed is at least partly bounded by a semipermeable membrane wall (26) which is permeable for the solvent of the solution (12) to be processed, but not for the substance dissolved therein, and wherein at least one flow passage (22) conducting the draw solution (20) is bounded on mutually oppositely disposed sides by membrane walls (26) which are associated with two adjacent flow passages (18) conducting the solution (12) to be processed such that solvent from the solution (12) to be processed arrives in the adjacent flow passages (22) conducting the draw solution (20) through the membrane walls (26), wherein the product recovery device (28) has a heated desorber stage (56) which is flowed through by diluted draw solution (20') exiting the forward osmosis device (16) and which comprises at least one gas space (58) as well as at least one flow passage (22) conducting the diluted draw solution (20'), wherein a respective gas space (58) is at least partly bounded by a vapor-permeable, liquid-tight membrane wall (38) and wherein at least one flow passage (22) is provided which is formed between such a gas space (58) and a heating unit (32) adjacent thereto and which conducts the diluted draw solution (20') such that gas mixture (60) expelled from the diluted draw solution (20')

arrives in the gas space (58) through the membrane wall (38) and/or wherein the product (14) can be led off in the form of draw solution (120) exiting the heated desorber stage (56) and purified of the gas mixture (60);

wherein the gas mixture (60) arising in the heated desorber stage (56) is supplied to a combined absorber/solution cooler stage (62) for generating regenerated draw solution (20), and/or wherein the regenerated draw solution (20) obtained through this absorber/solution cooler stage (62) is again supplied to the forward osmosis device (16);

wherein the draw solution (20) is a solution which can be both separated and regenerated via the vapor pressure;

wherein the absorber/solution cooler stage (62) comprises at least one gas space (58) and contains gas mixture (60) from the heated desorber stage (56) as well as at least one flow passage (22) conducting the purified or diluted draw solution (120 or 20'), wherein a respective gas space (58) is at least partly bounded by a vapor-permeable, liquid-tight membrane wall (38) and wherein at least one flow passage (22) is provided which is formed between such a gas space (58) and a cooling unit (52) adjacent thereto and which conducts the draw solution (20') such that the gas mixture flows from the gas space (58) through the membrane wall (38) into the flow passage (22) conducting the purified or diluted draw solution (120 or 20') and is dissolved in the purified or diluted draw solution (120 or 20') cooled by the cooling unit (52); and wherein a device (66) for drying and cooling gas (68) by means of a hygroscopic solution (70) is provided for supplying the absorber/solution cooler stage (62) or its cooling units (52) with cooling fluid (64).

2. The system in accordance with claim 1, wherein the draw solution (20) flows through the forward osmosis device (16) in counter-flow to the solution (12) to be processed.

3. The system in accordance with claim 1, wherein the forward osmosis device (16) comprises a plurality of flow passages (18) in parallel with one another and conducting the solution (12) to be processed as well as a plurality of flow passages (22) in parallel with one another and conducting the draw solution (20).

4. The system in accordance with claim 3, wherein the flow passages (22) conducting the draw solution (20) are each bounded on mutually oppositely disposed sides by membrane walls (26) which are associated with two adjacent flow passages (18) conducting the solution (12) to be processed.

5. The system in accordance with claim 1, wherein the heating unit (32) comprises a heating fluid space (36) at least partly bounded by a fluid-tight, heat-conducting wall (34).

6. The system in accordance with claim 1, wherein some of the purified draw solution (120) exiting the heated desorber stage (56) or some of the diluted draw solution (20') exiting the forward osmosis device (16) is moreover supplied to the combined absorber/solution cooler stage (62), and/or wherein in the latter case only such a part quantity of the diluted draw solution (20') exiting the forward osmosis device (16) is supplied to the heated desorber stage (56) by which the mass of the concentrated draw solution (20) increased on flowing through the forward osmosis device (16) while the remaining part quantity of diluted draw solution (20') is supplied to the combined absorber/solution cooler stage (62).

7. The system in accordance with claim 1, wherein the gas drying/cooling device (66) has a gas cooler/absorber stage (72) which comprises at least one gas flow passage (74) as well as at least one flow passage (76) conducting the hygroscopic solution (70), wherein the inner space or gas space (78) of a respective gas flow passage (74) is bounded at least partly by a vapor-permeable, liquid tight membrane wall (38) and at least one flow passage (76) is provided which is formed between such a gas flow passage (74) and a further such gas flow passage (74) adjacent thereto or an adjacent cooling unit and which conducts the hygroscopic solution (70) such that moisture is transferred into the hygroscopic solution (70) from the gas (68) via the membrane wall (38) and is absorbed therein.

8. The system in accordance with claim 7, wherein the gas cooler/absorber stage (72) comprises a plurality of gas flow passages (74) in parallel with one another as well as a plurality of flow passages (76) in parallel with one another and conducting the hygroscopic solution (70).

9. The system in accordance with claim 8, wherein the flow passages (76) of the gas cooler/absorber stage (72) conducting the hygroscopic solution (70) are respectively formed between two mutually adjacent gas flow passages (74).

10. The system in accordance with claim 8, wherein the flow passages (76) of the gas cooler/absorber stage (72) conducting the hygroscopic solution (70) are respectively formed between a gas flow passage (74) and an adjacent cooling unit.

11. The system in accordance with claim 7, wherein the hygroscopic solution (70) exiting the gas cooler/absorber stage (72) is supplied to a regeneration stage (80) in which it is regenerated, and/or wherein the regenerated hygroscopic solution (70) is again supplied to the gas cooler/absorber stage (72), and/or wherein the regenerated hygroscopic solution (70) is again supplied to the gas cooler/absorber stage (72) via a cooler (82).

12. The system in accordance with claim 11, wherein the regeneration stage (80) comprises at least one gas flow passage (74), as well as at least one flow passage (76) which conducts the hygroscopic solution (70), wherein the inner space or gas space (78) of a respective gas flow passage (74) is at least partly bounded by a vapor-permeable, liquid-tight membrane wall (38) and wherein at least one flow passage (76) is provided which is formed between such a gas flow passage (74) and a further such gas flow passage (74) adjacent thereto and which conducts the hygroscopic solution (70) such that moisture is transferred from the hygroscopic solution (70) via the membrane wall (38) into the gas conducted in the gas flow passage (74) and the hygroscopic solution (70) is concentrated.

13. The system in accordance with claim 12, wherein the regeneration stage (80) comprises a plurality of gas flow passages (78) in parallel with one another as well as a plurality of flow passages (76) in parallel with one another and conducting the hygroscopic solution (70), and/or wherein the flow passages (76) of the regeneration stage (80) conducting the hygroscopic solution (70) are each formed between two mutually adjacent gas flow passages (74).

14. The system in accordance with claim 11, wherein the regeneration stage (80) provided for regenerating the hygroscopic solution (70) has a heating stage (30) which is flowed through by the hygroscopic solution (70) exiting the gas cooler/absorber stage (72) and which comprises at least one heating unit (32) and at least one evaporator unit (V), wherein a respective heating unit (32) comprises a heating fluid space (36) at least partly bounded by a fluid-tight, heat-conducting wall (34) and a respective evaporator unit (V) comprises a vapor space (40) at least partly bounded by a vapor-permeable, liquid-tight membrane wall (38), and wherein at least one flow passage (76), which is formed between a heating unit (32) and an evaporator unit (V) adjacent thereto and which conducts the hygroscopic solution (70), is provided in the heating stage (30) such that the hygroscopic solution (70) is heated via the fluid-tight, heat-conducting wall (34) and the vapor arising from the hygroscopic solution (70) arrives in the vapor space (40) through the membrane wall (38).

15. The system in accordance with claim 14, wherein the regeneration stage (80) has at least one condensation/evaporation stage (42) which is flowed through by the hygroscopic solution (70) exiting the heating stage (30), which is supplied with vapor (92) arising in the heating stage (30) and which comprises at least one condensation unit (K) and at least one evaporator unit (V), wherein a respective condensation unit (K) comprises a first vapor space (46) at least partly bounded by a condensation wall (44) and a respective evaporator unit (V) comprises a second vapor space (48) at least partly bounded by a vapor-permeable, liquid-tight membrane wall (38), and wherein at least one flow passage (77), which is formed between such a condensation unit (K) and such an evaporator unit (V) adjacent thereto and which conducts the hygroscopic solution (70), is provided in a respective condensation/evaporation stage (42) such that the hygroscopic solution (70) is heated via the condensation wall (44) and the vapor arising from the hygroscopic solution (70) arrives in the second vapor space (48) through the membrane wall (38), and/or with the hygroscopic solution (70) exiting the last condensation/evaporation stage (42) again being supplied to the gas cooler/absorber stage (72).

16. The system in accordance with claim 14, wherein the regeneration stage (80) comprises a condensation stage (50) having at least one cooling unit (52) and at least one condensation unit (K), wherein a respective cooling unit (52) comprises a cooling fluid space (54) and a respective condensation unit (K) comprises a vapor space (46) at least partly bounded by a condensation wall (44) and wherein at least one cooling unit (52) is directly adjacent to at least one condensation unit (K) in the condensation stage (50) such that the condensation wall (44) of the respective condensation unit (K) is cooled via the cooling unit (52), and/or wherein the cooling fluid space (54) is at least partly bounded by a fluid-tight, heat-conducting wall (34) and/or wherein vapor arising in a preceding condensation/evaporator stage (42) is supplied to the condensation stage (50).

17. The system in accordance with claim 11, wherein the system is configured as a modular flow system having a plurality of frame elements and the different functional units of the respective flow passage (18) conducting the solution (12) to be processed, the respective heating unit (32), the respective cooling unit (52), the respective gas space (58) and/or the respective gas flow passage (74) are provided in the form of such a frame element, and/or wherein the frame elements are provided with web structures (84), and/or wherein the frame elements can be connected to one another via the web structures for forming the forward osmosis device (16), a respective heating stage (30), a respective condensation/evaporation stage (42), a respective condensation stage (50), the heated desorber stage (56), the combined absorber/solution cooler stage (62), the gas cooler/absorber stage (72) and/or the regeneration stage (80) provided for regenerating the hygroscopic solution (70), and each comprise an inner region (88) which is surrounded by an outer frame (86) and which is provided with a spacer (90) having two sides, and/or wherein a respective corresponding functional surface is applied to the two sides, and/or wherein the functional surface is applied in the form of a film or membrane, for forming a respective inner space (24), a respective heating fluid space (36), a respective vapor space (40, 46, 48), a respective cooling fluid space (54), a respective gas space (58) or a respective inner space or gas space (78).

\* \* \* \* \*